(12) United States Patent
Onodera et al.

(10) Patent No.: US 9,272,349 B2
(45) Date of Patent: Mar. 1, 2016

(54) NUMERICAL CONTROL DEVICE, WIRE ELECTRIC DISCHARGE MACHINING APPARATUS USING THE SAME, AND WIRE ELECTRIC DISCHARGE MACHINING METHOD USING THE SAME

(75) Inventors: Yasuo Onodera, Chiyoda-ku (JP); Takahiro Shiozawa, Chiyoda-ku (JP); Seiji Satou, Chiyoda-ku (JP); Yoshikazu Ukai, Chiyoda-ku (JP); Hiroatsu Kobayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 729 days.

(21) Appl. No.: 13/574,521

(22) PCT Filed: Jan. 22, 2010

(86) PCT No.: PCT/JP2010/000353
§ 371 (c)(1),
(2), (4) Date: Sep. 27, 2012

(87) PCT Pub. No.: WO2011/089648
PCT Pub. Date: Jul. 28, 2011

(65) Prior Publication Data
US 2013/0024020 A1   Jan. 24, 2013

(51) Int. Cl.
*G06F 19/00* (2011.01)
*B23H 7/20* (2006.01)
(Continued)

(52) U.S. Cl.
CPC .................. *B23H 7/20* (2013.01); *B23H 7/102* (2013.01); *B23H 7/14* (2013.01)

(58) Field of Classification Search
CPC .. G05B 19/4097; G05B 19/182; G05B 19/18; G05B 19/19; G05B 19/414; G05B 19/401; G05B 19/4067; G05B 19/40938; G05B 19/4163; G05B 19/402; G05B 2219/49305; G05B 2219/50063; B23H 7/20; B23H 7/102; B23H 7/14; B23H 1/00; B23H 7/26; B23H 9/00; B24B 9/146; B24B 13/005; B24B 47/225; B24B 51/00; B24B 55/02; B24B 5/02
USPC ........................................................ 700/159
See application file for complete search history.

(56) References Cited

U.S. PATENT DOCUMENTS 4,862,095 A * 8/1989 Yamamoto et al. ........ 219/69.12
5,306,889 A * 4/1994 Kaneko et al. ............. 219/69.12
(Continued)

FOREIGN PATENT DOCUMENTS

JP   02-212023 A   8/1990
JP   08-118146 A   5/1996
(Continued)

OTHER PUBLICATIONS

Japanese Office Action (Notice of Rejection), Aug. 20, 2013, Application No. 2011-550717.

*Primary Examiner* — Robert Fennema
*Assistant Examiner* — Sivalingam Sivanesan
(74) *Attorney, Agent, or Firm* — Sughrue Mion, PLLC; Richard C. Turner

(57) ABSTRACT

A numerical control device for a wire electric discharge machining apparatus generates a wire-breakage sign signal, outputs a machining-condition re-setting instruction and wire-breakage threshold re-setting instruction from the wire-breakage sign signal and wire-breakage threshold, sets the wire-breakage threshold according to the wire-breakage threshold re-setting instruction and a wire-breakage signal, calculates a machining energy from a discharge pulse count, measures a machining speed from position information, calculates a board thickness of the workpiece from the machining energy and machining speed, outputs, according to a predetermined algorithm, a machining-condition switching instruction from the board thickness, the machining-condition re-setting instruction, and the wire-breakage signal, sends an oscillation instruction to a oscillator and sends a shaft feed instruction to a servo amplifier so that the machining condition is set to one determined by the machining-condition switching instruction, and stores the machining condition and wire-breakage threshold that correspond to each board thickness.

9 Claims, 6 Drawing Sheets

(51) Int. Cl.
 *B23H 7/10* (2006.01)
 *B23H 7/14* (2006.01)

(56) References Cited

U.S. PATENT DOCUMENTS

2008/0110865 A1* 5/2008 Hashimoto et al. ........ 219/69.12
2009/0228135 A1* 9/2009 Nakamura .................... 700/173
2010/0133237 A1* 6/2010 Onodera et al. ........... 219/69.13

FOREIGN PATENT DOCUMENTS

| JP | 08118146 A * | 5/1996 |
| JP | 10-029117 A | 2/1998 |
| JP | 2008-036812 A | 2/2008 |

* cited by examiner

NUMERICAL CONTROL DEVICE, WIRE ELECTRIC DISCHARGE MACHINING APPARATUS USING THE SAME, AND WIRE ELECTRIC DISCHARGE MACHINING METHOD USING THE SAME

CROSS REFERENCE TO RELATED APPLICATION

This application is a National Stage of International Application No. PCT/JP2010/000353 filed Jan. 22, 2010, the contents of all of which are incorporated herein by reference in their entirety.

TECHNICAL FIELD

The present invention relates to wire electric discharge machining apparatuses, especially to those having a function of preventing a wire electrode from breaking.

BACKGROUND ART

In a wire electric discharge machining apparatus, it is general that the larger the machining energy, the faster the machining speed. Therefore, in order to increase the machining speed, the machining energy is increased by increasing the discharge current peak value or the discharge frequency. However, the higher the discharge current peak value or the discharge frequency, the more the risk of wire electrode breakages increases. That is, there exists a limit (wire-breakage limit) to the discharge current peak value and the discharge frequency for continuing discharge operation without wire electrode breakages. In conventional wire electric discharge machining apparatuses, techniques have been developed under the restriction of the wire-breakage limit to increase machining energy as much as possible.

By the way, it is known that the discharge current peak value and the discharge frequency relating to the wire-breakage limit depend on the diameter and material of a wire electrode, the board thickness and the material of a workpiece, and machining conditions including a condition of a machining fluid jet. Among these, the wire electrode and workpiece materials do not vary during a machining operation, however the board thickness of the workpiece and the machining condition may vary. Thus, for efficiently machining without wire electrode breakages, in a conventional technique, the machining condition is controlled according to the board thickness and the machining state which vary during machining (for example, Patent Document 1).

PRIOR ART DOCUMENT

Patent Document

Patent Document 1: Japanese Patent Laid-Open No. H8-118146

DISCLOSURE OF INVENTION

Problem to be Solved by the Invention

A wire breakage limit depends on the board thickness of a workpiece, therefore, a machining condition based on a board portion having a thickness of a high wire-breakage limit causes wire electrode breakages at a board portion having a thickness of a low wire-breakage limit. On the other hand, a machining condition based on a board portion having a thickness of a low wire-breakage limit decreases machining speed at a board portion having a thickness of a high wire-breakage limit. To solve the problem, a wire electric discharge machining apparatus in Patent Document 1 calculates a board thickness to control its machining condition. Here, the board thickness is calculated from machining energy per unit time and a machining speed.

Next, an explanation is made of how to calculate the board thickness. First, a discharge machining volume per unit time is expressed as Equation (1), using a board thickness and a machining allowance of a workpiece, and a machining feed quantity per unit time, i.e., a machining speed.

$$\text{machining volume} = \text{board thickness} \times \text{machining allowance} \times \text{machining speed} \tag{1}$$

The machining volume is proportional to the machining energy. Furthermore, the machining allowance is usually controlled to be constant by servo control. Therefore, a modification of Equation (1) leads to Equation (2).

$$\text{board thickness} = \text{coefficient} \times \text{machining energy}/\text{machining speed} \tag{2}$$

The coefficient in Equation (2) can be obtained in advance by machining a workpiece whose board thickness is known. That is, calculations of the machining energy and the machining speed make known all values in Equation (2) except the coefficient, thereby making it possible to calculate the coefficient. If the coefficient can be determined, the board thickness can be calculated from Equation (2) by calculating the machining energy and the machining speed. In Patent Document 1, the machining condition is switched to an appropriate one that is determined in advance according to the calculated board thickness.

However, even if the machining condition is switched according to the board thickness, wire electrode breakages may occur. It is because the machining operation may, in some cases, become unstable depending on a machining shape and the state of a machining fluid jet. Such cases include a machining operation at a large step or a corner, and a machining operation in a state in which the machining fluid spray nozzle is distant from the workpiece. Thus, another technique is also disclosed in which wire electrode breakage signs caused by such unstable factors in machining are detected to avoid breakages. For example, in Patent Document 1, a wire-breakage sign signal is provided to detect a wire breakage sign, and when the wire-breakage sign signal exceeds a predetermined threshold, machining energy is decreased to avoid wire breakages. More specifically, a wire breakage indication is evaluated on the basis of a short circuit discharge pulse ratio=(short-circuit discharge pulse count/normal discharge pulse count) which expresses an occurrence rate of short-circuit between the workpiece and the wire electrode in a predetermined period. Then, when it is determined that a wire breakage may occur, the pulse voltage supply is suspended or reduced so that the total energy of discharge pulses does not exceed a predetermined threshold, whereby the machining was performed while preventing wire electrode breakages, in a condition close to a wire-breakage limit energy.

However, even when a wire-breakage sign signal is given, the conventional technique requires a value (wire-breakage threshold) by which to actually determine a breakage of a wire electrode in order to detect a wire breakage sign from the signal. The wire-breakage threshold depends on the diameter and material of the wire electrode, the thickness and material of the workpiece, or the like; therefore, the threshold must be determined by trial machining for examining whether or not a wire breakage occurs in respective conditions. However, a problem has been that the trial machining process cannot be automated, thereby taking a long time required throughout the machining.

SUMMARY OF THE INVENTION

A numerical control device for a wire electric discharge machining apparatus controls an oscillator outputting a discharge pulse for the wire electric discharge machining apparatus and controls a servo amplifier controlling a servo motor driving a wire electrode or a workpiece to cause relative movement therebetween, and the numerical control device includes: a wire-breakage-sign-signal generation means that generates a wire-breakage sign signal on the basis of machining state quantities inputted from the oscillator; a wire-breakage sign detection means that outputs a machining-condition re-setting instruction and a wire-breakage threshold re-setting instruction on the basis of the wire-breakage sign signal and a wire-breakage threshold; a wire-breakage threshold setting means that sets the wire-breakage threshold on the basis of the wire-breakage threshold re-setting instruction and a wire-breakage signal to be inputted; a machining energy calculation means that calculates a machining energy on the basis of a discharge pulse count inputted from the oscillator; a machining speed measurement means that measures a machining speed on the basis of position information inputted from the servo amplifier; a board thickness calculation means that calculates a board thickness of the workpiece on the basis of the machining energy and the machining speed; a machining-condition switching means that outputs a machining-condition switching instruction according to a predetermined algorithm on the basis of the board thickness, the machining-condition re-setting instruction, and the wire-breakage signal; a control means that sends an oscillation instruction to the oscillator and sends a shaft feed instruction to the servo amplifier, so as to make them operate according to a machining condition determined by the machining-condition switching instruction; a machining-condition storage means that stores the machining condition corresponding to the board thickness; and a wire-breakage threshold storage means that stores the wire-breakage threshold corresponding to the board thickness.

A wire electric discharge machining apparatus includes a servo amplifier controlling a servo motor driving a wire electrode or a workpiece to cause relative movement therebetween, an oscillator outputting a discharge pulse to a machining power supply for machining the workpiece by applying voltage to a machining gap between the wire electrode and the workpiece, a numerical control device controlling the oscillator and the servo amplifier to make them operate at a desired machining condition, and a wire breakage detector detecting breakage of the wire electrode to output a wire-breakage signal to the numerical control device, wherein the numerical control device comprising: a wire-breakage-sign-signal generation means that generates a wire-breakage sign signal on the basis of machining state quantities inputted from the oscillator; a wire-breakage sign detection means that outputs a machining-condition re-setting instruction and a wire-breakage threshold re-setting instruction on the basis of the wire-breakage sign signal and a wire-breakage threshold; a wire-breakage threshold setting means that sets the wire-breakage threshold on the basis of the wire-breakage threshold re-setting instruction and the wire-breakage signal; a machining energy calculation means that calculates a machining energy on the basis of a discharge pulse count inputted from the oscillator; a machining speed measurement means that measures a machining speed on the basis of position information inputted from the servo amplifier; a board thickness calculation means that calculates a board thickness of the workpiece on the basis of the machining energy and the machining speed; a machining-condition switching means that outputs a machining-condition switching instruction according to a predetermined algorithm on the basis of the board thickness, the machining-condition re-setting instruction, and the wire-breakage signal; a control means that sends an oscillation instruction to the oscillator and sends a shaft feed instruction to the servo amplifier, so as to make them operate according to a machining condition determined by the machining-condition switching instruction; a machining-condition storage means that stores the machining condition corresponding to the board thickness; and a wire-breakage threshold storage means that stores the wire-breakage threshold corresponding to the board thickness.

A wire electric discharge machining method by which a numerical control device controls an oscillator and a servo amplifier to make them operate at a desired machining condition, the servo amplifier controls a servo motor to drive a wire electrode or a workpiece to cause relative movement therebetween, the oscillator outputs a discharge pulse to a machining power supply so that voltage is applied to a machining gap between the wire electrode and the workpiece to machine the workpiece, and a breakage of the wire electrode is detected to output a wire-breakage signal to the numerical control device, the wire electric discharge machining method comprising the steps of: outputting, when a breakage of the wire electrode is detected, a machining-condition switching instruction to switch to the machining condition decreased by a predetermined value; calculating a board thickness on the basis of a machining energy and a machining speed; outputting, when the board thickness varies, a machining-condition switching instruction for switching to the machining condition having been set according to the varied board thickness; generating a wire-breakage sign signal on the basis of machining state quantities; re-setting, when the wire-breakage sign signal is larger than a wire-breakage threshold, the wire-breakage threshold to a value increased by a predetermined value to store the wire-breakage threshold and the machining condition; outputting, when the wire-breakage sign signal is smaller than the wire-breakage threshold, the machining-condition switching instruction for switching to the machining condition increased by a predetermined value to store the wire-breakage threshold and the machining condition; and switching the machining condition according to the machining-condition switching instruction to control the oscillator and the servo amplifier.

EFFECT OF THE INVENTION

According to the present invention, wire-breakage thresholds and appropriate machining conditions for respective board thicknesses can be automatically obtained in a trial machining process, thereby providing an effect that machining conditions can be set up automatically. The automatic set-up for machining conditions leads to an effect that development man-hours can be reduced. Furthermore, the reduction of development man-hours results in an effect that a time required throughout the machining can be reduced. Furthermore, wire-breakage thresholds and appropriate machining conditions for respective board thicknesses that are obtained in a trial machining are used for an actual machining, thereby providing an effect that the machining productivity can be enhanced.

MODE(S) FOR CARRYING OUT THE INVENTION

The present invention is explained below in detail, using figures representing embodiments of the present invention.

Embodiment 1

Figure 1:
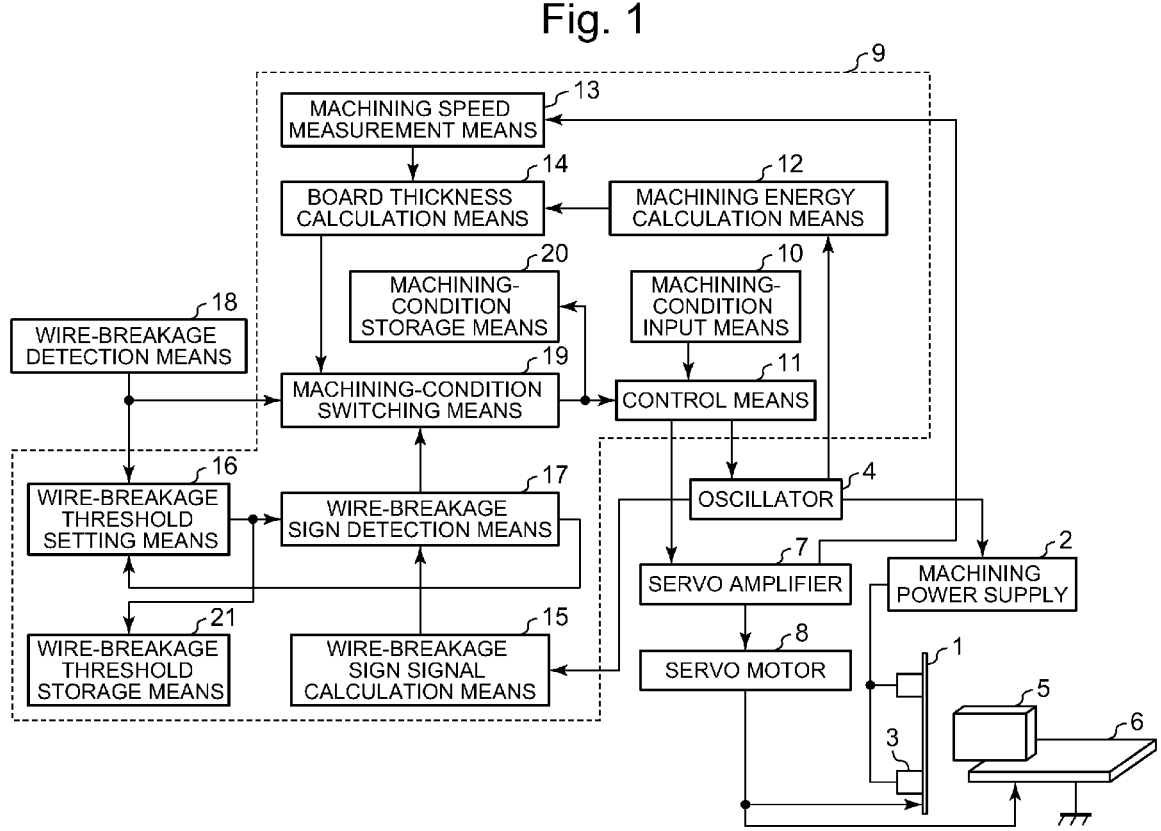
FIG. 1 is block diagram for explaining a trial machining operation in a wire electric discharge machining apparatus according to Embodiment 1 of the present invention.
Figure 2:
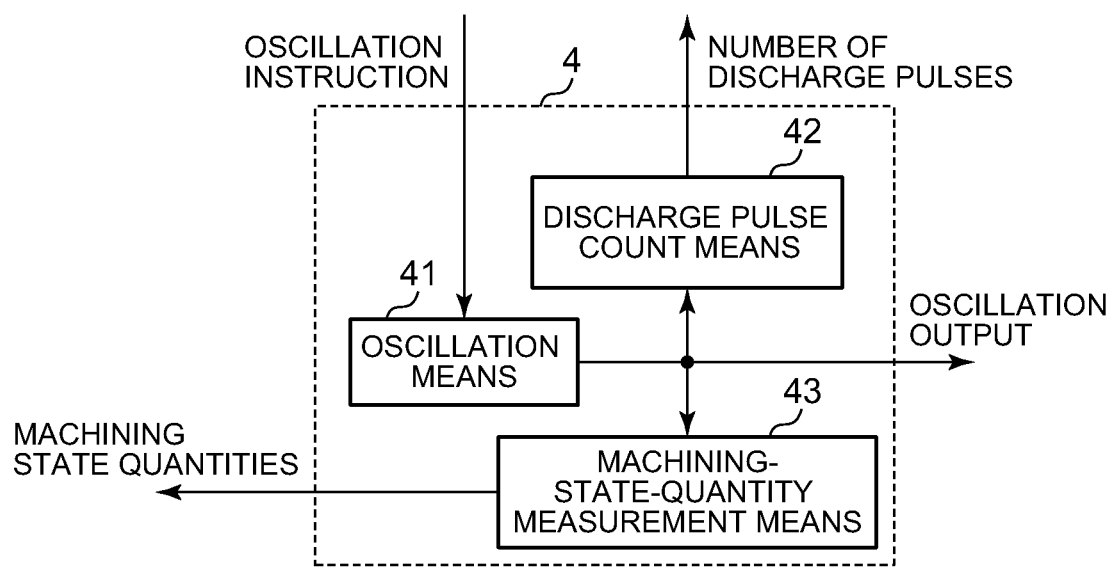
FIG. 2 is a block diagram showing a configuration of an oscillator 4 in FIG. 1.

First, a configuration of a wire electric discharge machining apparatus of Embodiment 1 is explained using figures. FIG. 1 is a block diagram showing the overall wire electric discharge machining apparatus according to Embodiment 1 of the present invention and is a block diagram for explaining a trial machining operation. FIG. 2 is a block diagram showing a configuration of an oscillator in FIG. 1. A pair of power feed terminals 3 that are connected to a machining power supply 2 are in contact with a wire electrode. The machining power supply 2 applies pulse voltages to the power feed terminals 3 according to an oscillation output from an oscillation means 41 in an oscillator 4. A workpiece 5 is placed on a workpiece table 6 to be machined by electrical discharges generated in a machining gap between the wire electrode 1 and the workpiece. During a machining operation, a servo motor 8 driven by a servo amplifier 7 moves the wire electrode 1 relative to the workpiece 5 at a predetermined speed.

In an NC apparatus 9, according to machining conditions inputted through a machining-condition input means 10, a control means 11 controls an oscillation means 41 by an oscillation instruction for a desired machining condition and controls a servo amplifier 7 by a shaft feed instruction for the desired condition. On the other hand, using a discharge pulse count means 42, the oscillator 4 counts the number of discharge pulses generated in the machining gap in a predetermined period to output the number to the NC apparatus 9. Moreover, using a machining-state-quantity measurement means 43, the oscillator 4 measures machining state quantities, which are outputted to the NC apparatus 9. The machining state quantities mean, for example, a discharge current, a discharge voltage, a no-load period, and the number of discharge pulses. A machining-state-quantity measurement means 43 that measures such quantities are, for example, a current sensor, a voltage sensor, and a counter. The servo amplifier 7 outputs a position feedback value in a linear scale (not shown in the figure) to the NC apparatus 9.

The NC apparatus 9 and its surrounding blocks are explained. A machining energy calculation means 12 calculates machining energy from the number of discharge pulses inputted from the oscillator 4. A machining speed measurement means 13 measures a machining speed from position feedback values, i.e., position information inputted from the servo amplifier 7. A board thickness calculation means 14 calculates a board thickness of the workpiece 5 from the machining energy and the machining speed.

On the basis of the machining state quantities inputted from the oscillator 4, a wire-breakage sign signal calculation means 15 calculates a wire-breakage sign signal to output the signal. A wire-breakage threshold setting means 16 sets and outputs a wire-breakage threshold. A wire-breakage sign detection means 17 compares the wire-breakage sign signal with the wire-breakage threshold to output a machining-condition re-setting instruction and a wire-breakage threshold re-setting instruction.

A wire-breakage detection means 18 is provided in a feed motor for the wire electrode 1, not shown in the figures, detects whether or not the wire electrode 1 breaks, and outputs a wire-breakage detection signal, which is a wire-breakage signal, when detecting a wire breakage.

On the basis of a predetermined algorithm using the machining-condition re-setting instruction and the wire-breakage signal, a machining-condition switching means 19 sends to the control means 11 a machining-condition switching instruction, for every board thickness of the workpiece. Moreover, a machining condition and a wire-breakage threshold that correspond to the board thickness in this case are stored in a machining-condition storage means 20 and a wire-breakage threshold storage means 21, respectively.

Figure 3:
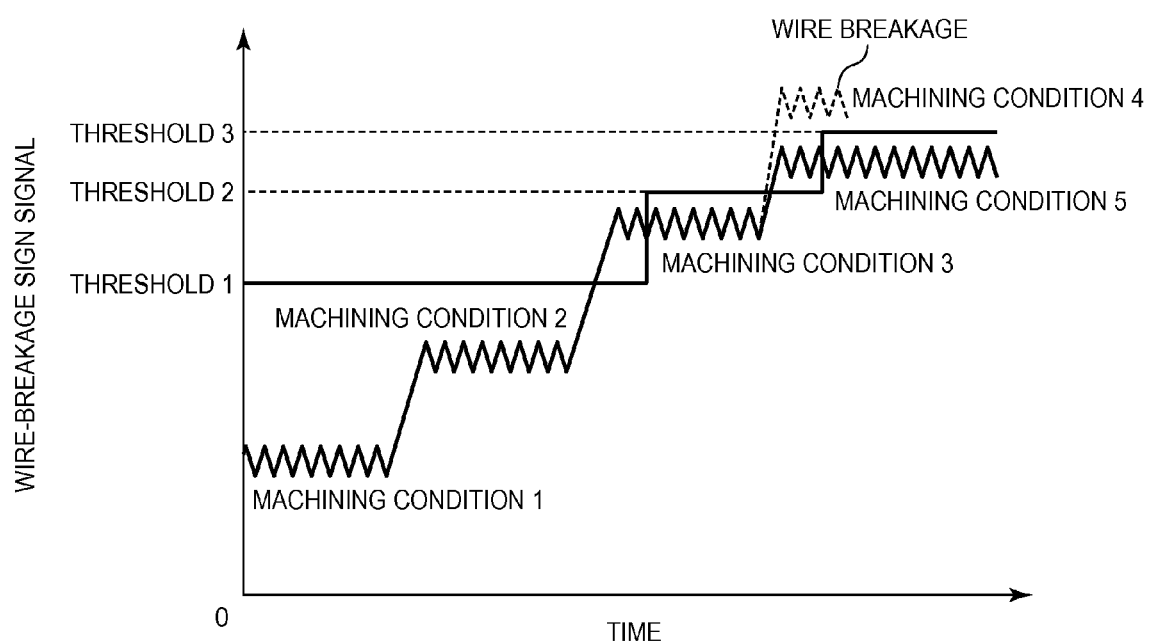
FIG. 3 is a figure for explaining adjustments of a wire-breakage threshold and a machining condition during the trial machining according to Embodiment 1 of the present invention.

Before explaining the operation in Embodiment 1, the principle of the present invention is explained. In the present invention, wire-breakage thresholds and appropriate machining conditions according to board thicknesses are obtained by automatically adjusting the wire-breakage threshold and machining condition in trial machining. FIG. 3 is a figure for explaining adjustment of the wire-breakage threshold and the machining condition in a trial machining process for the workpiece 5 having an unvarying board thickness; in the figure, the horizontal axis represents time, and the vertical axis represents the wire-breakage sign signal. In addition, the explanation of Embodiment 1 is made under a presumption that the larger the wire-breakage sign signal is, the larger the possibility of the wire breakage is.

In FIG. 3, the magnitude relation among machining energies in Machining conditions 1 through 5 is assumed that [Machining condition 1]<[Machining condition 2]<[Machining condition 3]<[Machining condition 5]<[Machining condition 4]. First, at the start point of trial machining, Machining condition 1 is set as the initial value of the machining condition, and Threshold 1 is set as the initial value of the wire-breakage threshold. FIG. 3 shows that at this point, the value of the wire-breakage sign signal under Machining condition 1 is smaller than Threshold 1. Thus, it is determined that there is no possibility of wire breakage, and then the machining condition is switched to Machining condition 2 for one-level higher energy. In addition, a stepwise switch called as "notch" is used for the switching. That is, it is presumed that the operation of switching from Machining condition 1 to Machining condition 2 is performed by switching the setting value of the notch. More specifically, by switching the notch setting value, the peak value of the discharge current and the discharge pulse frequency are increased, thereby increasing the machining energy.

As shown in FIG. 3, although the wire-breakage sign signal becomes larger after switching to Machining condition 2, the wire-breakage sign signal under Machining condition 2 still remains below Threshold 1, thereby making a determination that there is no possibility of wire breakage. Then, this causes another switching to Machining condition 3 for a machining energy one-level higher. FIG. 3 shows that at this point, the value of the wire-breakage sign signal becomes larger than Threshold 1 after switching to Machining condition 3.

When the wire-breakage sign signal is larger than the wire-breakage threshold, a wire breakage in the wire electrode 1 is expected. However, in Embodiment 1, explanation is made under an assumption that the wire electrode 1 does not break. Because the wire electrode 1 does not break, it is determined that Threshold 1 is not a true wire-breakage threshold. Then, the wire-breakage threshold is changed to Threshold 2 that is larger than the wire-breakage sign signal under Machining condition 3. Because the change of the wire-breakage threshold to Threshold 2 leads to a condition that the wire-breakage sign signal is smaller than Threshold 2, it is determined that there is no risk of wire breakage. Then, the machining condition is switched to Machining condition 4 for a machining energy one-level higher. In Embodiment 1, it is presumed that the use of Machining condition 4 causes the wire electrode 1 to break.

From this result, it is found that the wire electrode 1 does not break at Machining condition 3, but it breaks at Machining condition 4. Thus, the machining condition is switched to Machining condition 5 for a machining energy which is larger than that at Machining condition 3 and smaller than that at Machining condition 4. More specifically, Machining condition 5 is set, for example, by setting the notch to a value between notch setting values corresponding to Machining condition 3 and Machining condition 4. Moreover, if presuming that wire breakage does not occur at Machining condition 5, the wire-breakage threshold is modified to Threshold 3 which is larger than the wire-breakage sign signal at Machining condition 5.

By adjusting the wire-breakage threshold and the machining condition in a manner as described above, the wire-breakage threshold approaches a true wire-breakage threshold and the machining condition approaches an appropriate machining condition. However, a lot of repetitions of the above-described process cause an increase in the wire breakage count during the trial machining and an increase in the time required for the trial machining process. Then, the process is configured to be completed within an appropriate time by, for example, terminating the process when an adjustment width of the wire-breakage threshold falls within a predetermined value. More specifically, it suffices that the process is performed on the condition that the process is completed when the adjustment width becomes smaller than that adjustable by the notch.

In Embodiment 1, the explanation has been made under the presumption that the board thickness of the workpiece 5 does not vary during the trial machining; however, in the actual trial machining, the board thickness may sometimes vary. Because the wire-breakage threshold and the appropriate machining condition corresponding thereto depend on a board thickness, a variation in the board thickness during machining causes a change in the appropriate machining condition. Therefore, in Embodiment 1, the board thickness is continually detected during the trial machining; when a different board thickness is calculated, a similar process as shown in FIG. 3 is performed to obtain a wire-breakage threshold and an appropriate machining condition for the different board thickness.

The wire-breakage threshold and the machining condition obtained by the trial machining are stored, for each board thickness, in the wire-breakage threshold storage means 21 and the machining-condition storage means 20, respectively. Then, in the actual machining, a wire-breakage threshold and an appropriate machining condition for each board thickness are read out from these storage means to be used as a condition for machining the workpiece 5. As describe above, wire-breakage thresholds and appropriate machining conditions can be automatically obtained in a trial machining, thereby reducing development man-hours. In an actual machining, a machining operation is performed using the appropriate machining conditions according to the board thicknesses, while avoiding breakages of the wire electrode 1; therefore, the machining conditions can be set automatically, thereby enhancing the productivity.

Figure 4:
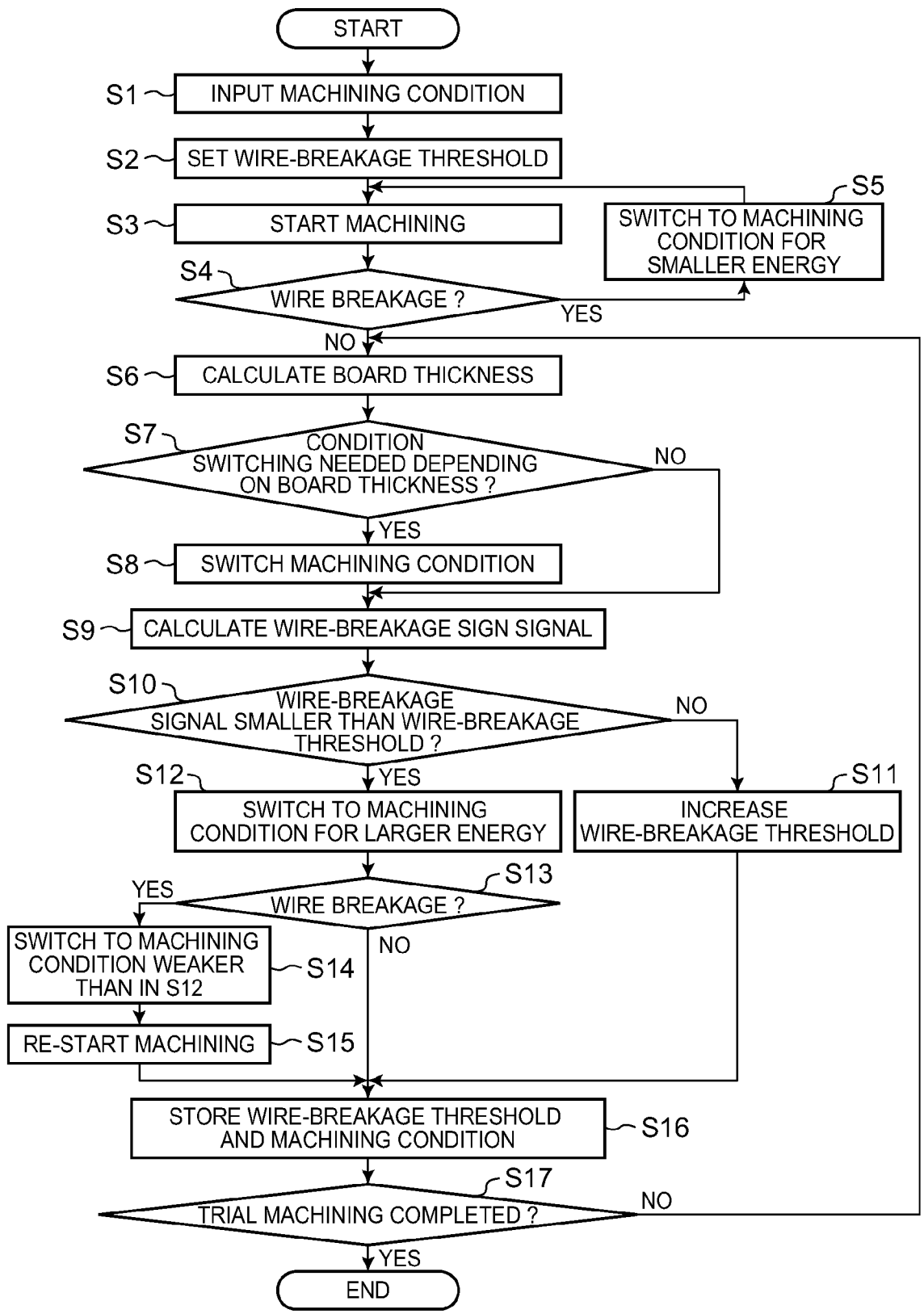
FIG. 4 is a flow chart showing a procedure for adjusting the wire-breakage threshold and the machining condition in the trial machining according to Embodiment 1 of the present invention.

Next, an operation in Embodiment 1 is explained using figures. In this embodiment, an actual machining is performed after a trial machining; thus, an explanation of the trial machining is made first. FIG. 4 is a flow chart showing a procedure for obtaining wire-breakage thresholds and appropriate machining conditions in the trial machining. In order to perform a trial machining, a user selects a trial machining mode using a machining mode selection means not shown in the figure. Next, a machining condition is inputted by the user or in a manufacturer using the machining-condition input means 10 (Step S1). The machining condition inputted from the machining-condition input means 10 includes, for example, a discharge current value, discharge voltage, discharge suspension time, and machining feed speed. A wire-breakage threshold is inputted by the user or in the manufacturer using a wire-breakage threshold input means not shown in the figure, to be set in the wire-breakage threshold setting means 16 (Step S2), and then a machining operation is started (Step S3). By using an encoder, a sensor, or the like which are provided in a wire running system or the wire feed motor, the wire-breakage detection means 18 checks whether a wire breakage occurs under the condition having been set by detecting the presence or absence of breakage of the wire electrode 1 (Step S4).

When a wire breakage is detected in Step S4, the machining-condition switching means 19 sends a switching instruction to the control means 11, to switch to a machining condition for an energy smaller than that applied by the machining condition having been set in Step S1 (Step S5). On the other hand, when a machining operation starts without a wire breakage in Step S4, the board thickness calculation means 14 calculates a board thickness (Step S6). The board thickness is calculated according to Equation (2).

How to calculate machining energy and a machining speed in the right side of Equation (2) is explained below. The number of discharge pulses counted by the discharge pulse count means 42 is sent to the machining energy calculation means 12. The machining energy calculation means 12 calculates the machining energy from the product of the discharge pulse count and a discharge current to send the energy to the board thickness calculation means 14. On the other hand, the machining speed can be obtained by the machining speed measurement means 13. More specifically, a machining feed quantity per unit time, i.e. a machining speed, is measured using a position feedback value from a linear scale and is sent to the board thickness calculation means 14.

A board thickness calculated by the board thickness calculation means 14 is sent to the machining-condition switching means 19; then, if the board thickness is different from that in the last calculation, the machining-condition switching means 19 determines to switch the machining condition (Step S7). If the determination is made to switch the machining condition, the machining-condition switching means 19 sends a machining-condition switching instruction to the control means 11, to switch to a corresponding machining condition out of those having been set for the respective board thicknesses (Step S8), and then the process proceeds to Step S9; if the determination is made not to switch the machining condition, the process skips Step S8 and proceeds to Step S9.

Next, the wire-breakage sign signal calculation means 15 calculates a wire-breakage sign signal on the basis of a machining state quantity inputted from the machining-state-quantity measurement means 43 (Step S9) to output the signal to the wire-breakage sign detection means 17. In this embodiment, an explanation is made using a short circuit discharge pulse ratio described in Patent Document 1 as a wire-breakage sign signal to be calculated from the machining state quantity. That is, the machining-state-quantity measurement means 43 counts the number of normal discharge pulses and the number of short-circuit discharge pulses to send these numbers as machining state quantities to the wire-breakage sign signal calculation means 15. The wire-breakage sign signal calculation means 15 calculates a short circuit discharge pulse ratio on the basis of these discharge pulse counts.

It is known that generally the larger the energy generated by the machining condition to be set, the faster the machining speed is and the higher the short circuit discharge pulse ratio is. In addition, because the discharge frequency is extremely high and varies greatly, high frequency noise components are eliminated by a low-pass filter or the like for using the short circuit discharge pulse ratio as a wire-breakage sign signal.

A threshold for determining a breakage sign of the wire electrode 1 is set in the wire-breakage threshold setting means 16 and sent to the wire-breakage sign detection means 17. The wire-breakage sign detection means 17 compares the wire-breakage sign signal calculated by the wire-breakage sign signal calculation means 15 to the wire-breakage threshold set in the wire-breakage threshold setting means 16 (Step S10).

When the comparison result is that "wire-breakage sign signal">"wire-breakage threshold", it means that the wire electrode 1 is in a state that it does not break although the wire-breakage sign signal exceeds the wire-breakage threshold. Thus, the wire-breakage sign detection means 17 determines that the wire-breakage threshold is not appropriate. Then the wire-breakage sign detection means 17 sends a wire-breakage threshold re-setting instruction to the wire-breakage threshold setting means 16. When receiving the instruction, the wire-breakage threshold setting means 16 re-sets the wire-breakage threshold to a value increased by a given value determined by the notch, to send the threshold to the wire-breakage sign detection means 17 (Step S11).

On the other hand, when the comparison result is that "wire-breakage sign signal"≤"wire-breakage threshold", the wire-breakage sign detection means 17 determines that there is no possibility for wire breakage, to send to the machining-condition switching means 19 a machining-condition re-setting instruction that switches the machining condition to a machining condition for a larger energy. Receiving this instruction, the machining-condition switching means 19 sends to the control means 11 a machining-condition switching instruction for switching the machining condition to a machining condition for a machining energy increased by a given value determined by the notch (Step S12). The control means 11 controls the oscillator and the servo amplifier to operate in the machining condition for the increased machining energy, and then, the wire-breakage detection means 18 checks whether the wire electrode 1 breaks (Step S13). If the wire electrode 1 does not break, the process proceeds to Step S16. On the other hand, if the wire electrode 1 breaks, the wire-breakage detection means 18 outputs a wire-breakage detection signal. Then the machining-condition switching means sends to the control means 11 a machining-condition switching instruction for switching to a machining condition for a machining energy smaller than that applied by the modified condition in Step S12 (Step S14). As for a switched condition in Step S14, selected is an energy intermediate between the energies before and after the condition switching operation in Step 12, or an energy given by a notch value intermediate between the notch values before and after the switching operation. After switching the machining condition, the machining operation starts again (Step S15), and the process proceeds to Step S16.

In Step S16, the wire-breakage threshold and the machining condition that have been set are stored in the wire-breakage threshold storage means 21 and the machining-condition storage means 20, respectively, for each board thickness calculated by the board thickness calculation means 14 (Step S16). The process from Step S6 to Step S16 is repeated until the trial machining is completed (Step S17).

In addition, when the number of repetition of the process from Step S6 to Step S17 for a calculated board thickness is small, a machining condition to which to switch in Step S8 is not always appropriate.

However, as the procedures from Step S6 to Step S16 are repeated, the machining condition gradually approaches an appropriate one for the calculated board thickness.

In addition, the board thickness and the wire-breakage sign signal in the flow chart shown in FIG. 4 can be calculated under a prerequisite condition that the machining is being performed. Thus, the wire-breakage detection means 18 always detects breakage of the wire electrode 1 during machining, even in steps in which breakage determination of the wire electrode 1 is not clearly described. If the wire electrode 1 breaks, the machining restart process is performed.

Figure 5:
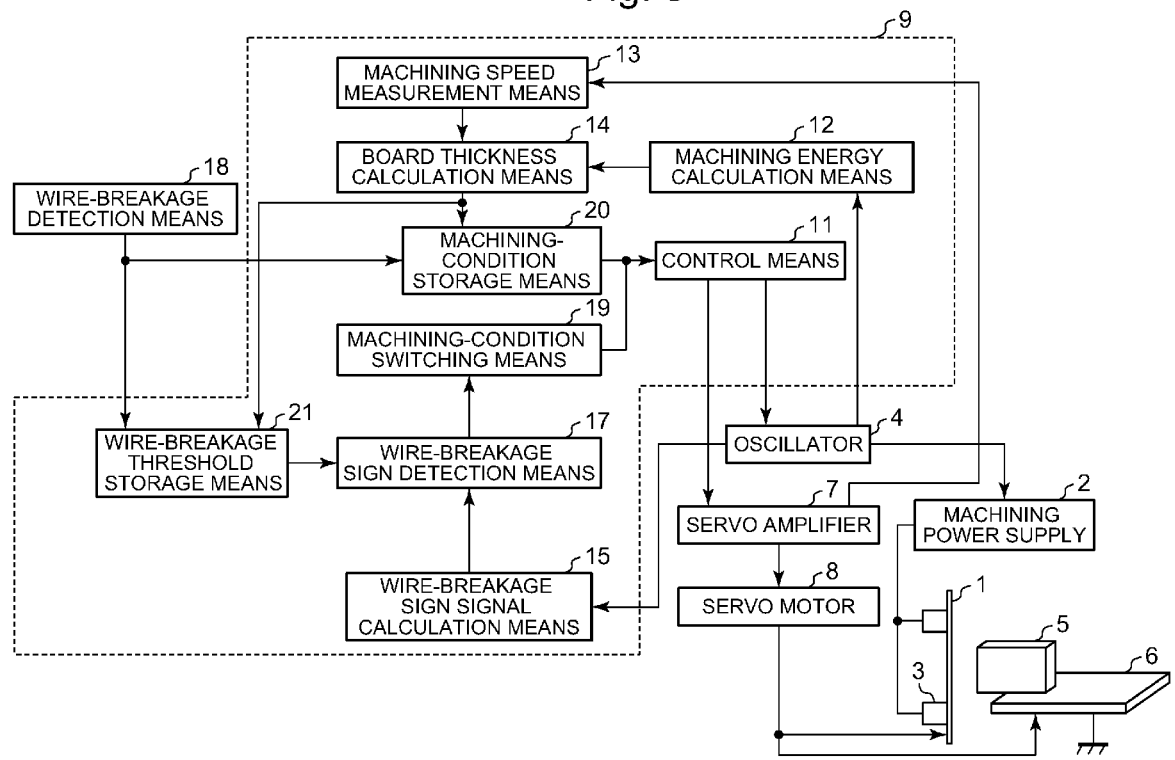
FIG. 5 is a block diagram for explaining an actual machining operation of the wire electric discharge machining apparatus according to Embodiment 1 of the present invention.
Figure 6:
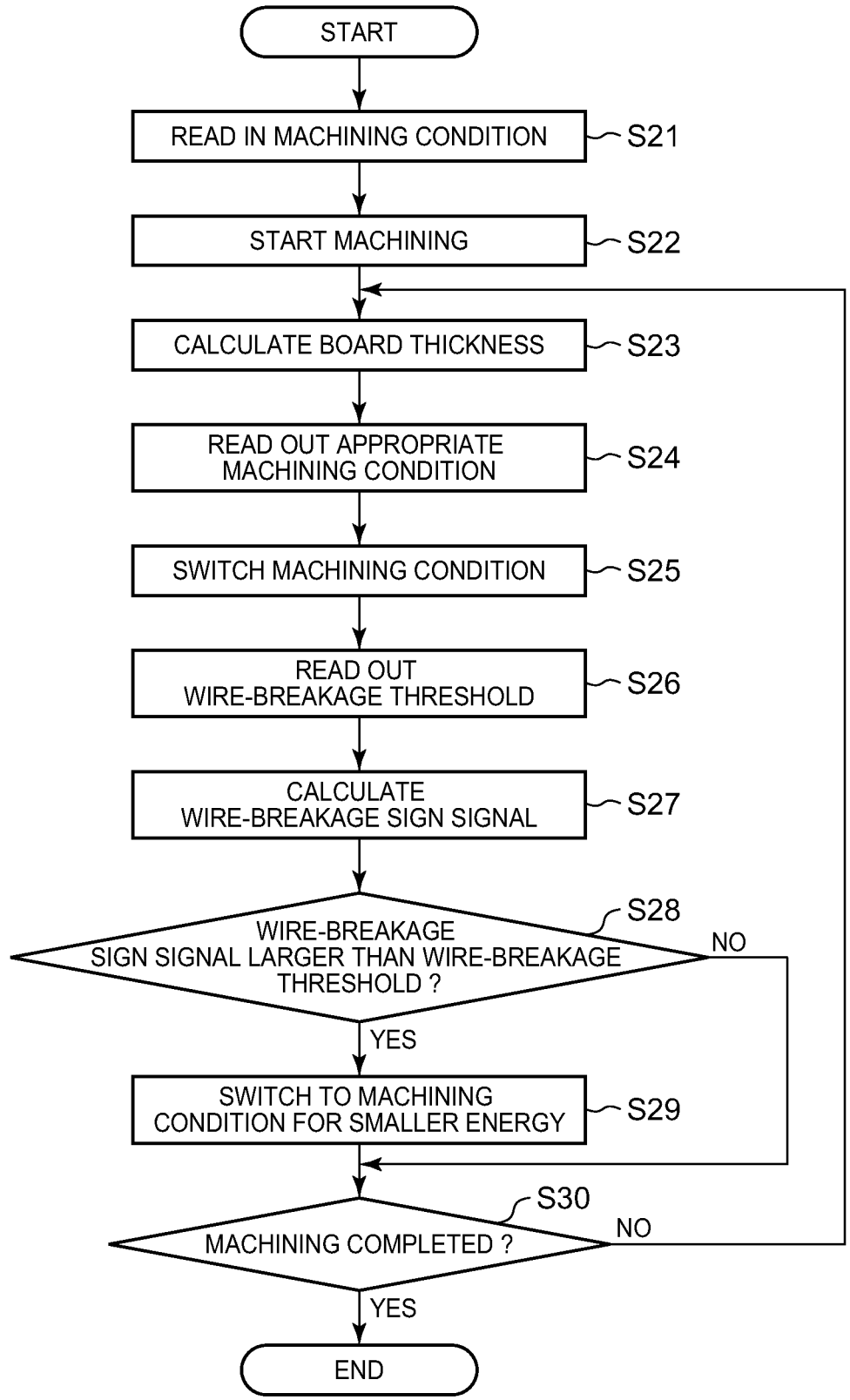
FIG. 6 is a flow chart showing a procedure of the actual machining operation of the wire electric discharge machining apparatus according to Embodiment 1 of the present invention, in which wire-breakage thresholds and machining conditions for respective calculated board thicknesses are used.

Next, an actual machining operation to be performed after the trial machining is explained. FIG. 5 is a block diagram showing a configuration of the wire electric discharge machining apparatus for the actual machining. In FIG. 5, the same numerals as those in FIG. 1 are used to designate the same components, explanations of which are omitted. The differences from FIG. 1 are that the machining-condition input means 10 and the wire-breakage threshold setting means 16 are not provided, and that some paths between blocks are different. FIG. 6 is a flow chart showing procedures by which the actual machining is performed using the wire-breakage thresholds and appropriate machining conditions that have been obtained for respective board thicknesses in the trial machining.

In order to perform an actual machining, the user selects an actual machining mode using a machining mode selection means not shown in the figure. The control means 11 reads an initial machining condition, referring to the machining conditions stored in the machining-condition storage means 20 (Step S21), and then starts machining (Step S22). The machining-condition storage means 20 stores the machining conditions for respective board thicknesses; however, because the board thickness is not calculated at the start of machining, selected is a machining condition for the smallest machining energy to avoid wire breakage.

After the start of machining, the board thickness calculation means 14 calculates the board thickness on the basis of Equation (2), using a machining energy outputted by the machining energy calculation means 12 and a machining feed quantity outputted by the machining speed measurement means 13 (Step S23). The calculated board thickness is sent to the machining-condition storage means 20. The machining-condition storage means 20 stores the appropriate machining conditions for the respective board thicknesses; thus, it reads out an appropriate machining condition according to the board thickness sent from the board thickness calculation means 14 (Step S24), to send it to the control means 11. The control means 11 switches to the machining condition read out from the machining-condition storage means 20 (Step S25).

On the other hand, the board thickness calculated by the board thickness calculation means 14 is also sent to the wire-breakage threshold storage means 21. The wire-breakage threshold storage means 21 stores the wire-breakage thresholds for the respective board thicknesses; thus, it reads out a wire-breakage threshold according to the board thickness sent from the board thickness calculation means 14 (Step S26), to send it to the wire-breakage sign detection means 17. The wire-breakage sign signal calculation means 15 calculates a wire-breakage sign signal on the basis of machining state quantities inputted from the oscillator 4 (Step S27), to send it to the wire-breakage sign detection means 17. The wire-breakage sign detection means 17 compares the wire-breakage sign signal to the wire-breakage threshold (Step S28).

If the comparison result is that "wire-breakage sign signal">"wire-breakage threshold", the wire-breakage sign detection means 17 determines that there is a possibility of wire breakage, to send a wire breakage sign detection signal to the machining-condition switching means 19. The machining-condition switching means 19 sends a switching instruction to the control unit 11 to switch to a machining condition for an energy smaller than that applied by the machining condition having been stored in the machining-condition storage means 20 (Step S29), and the process proceeds to Step S30.

On the other hand, if the comparison result is that "wire-breakage sign signal"≤"wire-breakage threshold", the wire-breakage sign detection means 17 determines that there is no possibility of wire breakage, and thus, the process proceeds to Step S30. By repeating the process from Step S23 to Step S29 until the actual machining is completed (Step S30), the machining operation can be performed using appropriate machining conditions according to calculated board thicknesses. Furthermore, in a case that there is a possibility of wire breakage, by switching to a machining condition for a smaller energy, the machining operation can be continued while avoiding breakages of the wire electrode 1.

In addition, control of avoiding breakage of the wire electrode 1 in an actual machining is performed by machining using appropriate machining conditions for respective board thicknesses obtained during a trial machining and further detecting wire breakage signs. When the wire electrode 1 nevertheless breaks for some reasons, the wire-breakage detection means 18 detects the wire breakage. In this case, a wire-breakage diagnosis means not shown in the figure checks whether or not the wire-breakage sign signal exceeds the wire-breakage threshold. If the check result is that the wire breakage occurs with the wire-breakage sign signal exceeding the wire-breakage threshold, the wire-breakage detection means 18 sends a wire-breakage detection signal to the machining-condition storage means 20. In response to that, the machining-condition storage means 20 re-stores, as a machining condition for the current board thickness, a machining condition for an energy smaller than that applied by the condition having been stored. On the other hand, in a case that the wire breakage occurs with the wire-breakage sign signal not exceeding the wire-breakage threshold, the wire-breakage detection means 18 sends a wire-breakage detection signal to the wire-breakage threshold storage means 21. In response to that, the wire-breakage threshold storage means 21 re-stores, as a wire-breakage threshold for the current board thickness, a threshold smaller than the wire-breakage sign signal when the wire breakage have occurred.

As described above, according to Embodiment 1, wire-breakage thresholds and appropriate machining conditions that correspond to respective board thicknesses can be automatically obtained in a trial machining, thereby giving an effect that machining conditions can be set automatically. In an actual machining, machining operations are performed using wire-breakage thresholds and appropriate machining conditions that are obtained for respective board thicknesses during a trial machining; thus, this gives an effect of enhancing machining productivity.

In addition, the explanation of Embodiment 1 has been made under a presumption that the servo motor 8 moves the wire electrode 1 relatively to the workpiece 5 at a predetermined speed; however, such moving operations are not always necessary. For example, it may be configured that the servo motor 8 drives the workpiece table 6 on which the workpiece 5 is placed. In other words, any configurations are allowed as long as relative movement between the wire electrode 1 and the workpiece 5 occurs.

In addition, the explanation of Embodiment 1 has been made under a presumption that machining conditions are inputted by a user or in a manufacturer through the machining-condition input means 10; however, such input operations are not always necessary. For example, the apparatus may have a configuration in which a predetermined machining condition is selected as an initial value when selecting trial machining or actual machining through the machining mode selection means not shown in the figures. With this configuration, the machining-condition input means 10 can be eliminated.

In Embodiment 1, board thicknesses are calculated by the board thickness calculation means 14; however, it is not always necessary. For example, using a board thickness input means which is not shown in the figure instead of the board thickness calculation means 14, the board thicknesses of a workpiece may be recognized by reading thicknesses from a three dimensional figure drawn by a CAD system or the like. In this case, each of Step S6 in FIG. 4 and Step S23 in FIG. 6 is a step for reading a board thickness. In addition, any board thickness input means suffices as long as it can recognize board thicknesses, which is not limited to the reading from three dimensional figures. This gives, without the board thickness calculation means 14, a similar effect as that given by the use thereof.

In Embodiment 1, the numbers of normal discharge pulses and short-circuit discharge pulses are counted by the machining-state-quantity measurement means 43 provided in the oscillator 4, and the short circuit discharge pulse ratio is calculated as a wire-breakage sign signal by the wire-breakage sign signal calculation means 15; however, these means are not always necessary. For example, machining state quantities may be measured on the basis of discharge voltage values or discharge current values; in such a case, there is no need for providing the machining-state-quantity measurement means in the oscillator 4. The adoption of such a configuration can give a similar effect, while reducing the burden on the oscillator 4.

In addition, the explanation of Embodiment 1 has been made under a presumption that the board thickness of the workpiece 5 remains unvarying during machining; actually, the board thickness may sometimes vary during machining. Because the wire-breakage threshold and the appropriate machining condition corresponding thereto differ depending on the board thickness, a variation in the board thickness during machining causes a change in the appropriate machining condition. This does not allow an appropriate machining. To deal with that, it suffices that in Embodiment 1, detection of the board thickness is always performed both during trial machining and during actual machining. In such a configuration, when a different board thickness is calculated, a similar procedure as shown in FIG. 3 or FIG. 6 is performed again, and a wire-breakage threshold and an appropriate machining condition that correspond to the different board thickness are obtained or set. Such a configuration can give a similar effect even when the board thickness of the workpiece 5 varies.

INDUSTRIAL APPLICABILITY

The present invention can be utilized, in the fields of machine tools and the like, for wire electric discharge machining apparatuses having a function of preventing a wire electrode from breaking.

NUMERAL EXPLANATION 1 wire electrode
2 machining power supply
3 power feed terminal
4 oscillator
5 workpiece
6 workpiece table
7 servo amplifier
8 servo motor
9 NC apparatus
10 machining-condition input means
11 control means
12 machining energy calculation means
13 machining speed measurement means
14 board thickness calculation means
15 wire-breakage sign signal calculation means
16 wire-breakage threshold setting means
17 wire-breakage sign detection means
18 wire-breakage detection means
19 machining-condition switching means
20 machining-condition storage means
21 wire-breakage threshold storage means
41 oscillation means
42 discharge pulse count means
43 machining-state-quantity measurement means

The invention claimed is:

1. A numerical control device for a wire electric discharge machining apparatus, that controls an oscillator outputting a discharge pulse for the wire electric discharge machining apparatus and controls a servo amplifier controlling a servo motor driving a wire electrode or a workpiece to cause relative movement therebetween, the numerical control device comprising:
 a wire-breakage-sign-signal generator that generates a wire-breakage sign signal on the basis of machining state quantities inputted from the oscillator;
 a wire-breakage sign detector that outputs a machining-condition re-setting instruction and a wire-breakage threshold re-setting instruction on the basis of the wire-breakage sign signal and a wire-breakage threshold;
 a wire-breakage threshold setting unit that sets the wire-breakage threshold on the basis of the wire-breakage threshold re-setting instruction and a wire-breakage signal to be inputted;
 a machining energy calculator that calculates a machining energy on the basis of a discharge pulse count inputted from the oscillator;
 a machining speed measurement means that measures a machining speed on the basis of position information inputted from the servo amplifier;
 a board thickness calculator that calculates a board thickness of the workpiece on the basis of the machining energy and the machining speed;
 a machining-condition switcher that outputs a machining-condition switching instruction according to a predetermined algorithm on the basis of the board thickness, the machining-condition re-setting instruction, and the wire-breakage signal;
 a control unit that sends an oscillation instruction to the oscillator and sends a shaft feed instruction to the servo amplifier, so as to make them operate according to a machining condition determined by the machining-condition switching instruction;
 a machining-condition storage unit that stores the machining condition corresponding to the board thickness; and
 a wire-breakage threshold storage unit that stores the wire-breakage threshold corresponding to the board thickness.

2. The numerical control device according to claim 1, wherein the machining state quantities are the number of normal discharge pulses and the number of short-circuit discharge pulses, and the wire-breakage sign signal is a short circuit discharge pulse ratio.

3. The numerical control device according to claim 1, wherein the wire-breakage sign detector compares the wire-breakage threshold to the wire-breakage sign signal, and during a trial machining, when the wire-breakage sign signal exceeds the wire-breakage threshold, the wire-breakage sign detector outputs the wire-breakage threshold re-setting instruction, and when the wire-breakage threshold re-setting instruction is inputted and the wire-breakage signal is not inputted, the wire-breakage threshold setting unit re-sets the wire-breakage threshold to a value increased by a predetermined value.

4. The numerical control device according to claim 1, wherein the wire-breakage threshold setting unit re-sets the wire-breakage threshold to a value decreased by a predetermined value when the wire-breakage threshold re-setting instruction is not inputted and the wire-breakage signal is inputted.

5. The numerical control device according to claim 1, wherein the wire-breakage sign detector compares the wire-breakage threshold to the wire-breakage sign signal, and during a trial machining, when the wire-breakage sign signal stays within the wire-breakage threshold, the wire-breakage sign detector outputs the machining-condition re-setting instruction, and when the machining-condition re-setting instruction is inputted, the machining-condition switcher outputs the machining-condition switching instruction to switch to the machining condition for the machining energy increased by a predetermined value.

6. The numerical control device according to claim 1, wherein the machining-condition switcher outputs the machining-condition switching instruction to switch to the machining condition for the machining energy decreased by a predetermined value when the wire-breakage signal is inputted during the trial machining.

7. A wire electric discharge machining apparatus that includes a servo amplifier controlling a servo motor driving a wire electrode or a workpiece to cause relative movement therebetween, an oscillator outputting a discharge pulse to a machining power supply for machining the workpiece by applying voltage to a machining gap between the wire electrode and the workpiece, a numerical control device controlling the oscillator and the servo amplifier to make them operate at a desired machining condition, and a wire breakage detector detecting breakage of the wire electrode to output a wire-breakage signal to the numerical control device, wherein the numerical control device comprising:

a wire-breakage-sign-signal generator that generates a wire-breakage sign signal on the basis of machining state quantities inputted from the oscillator;

a wire-breakage sign detector that outputs a machining-condition re-setting instruction and a wire-breakage threshold re-setting instruction on the basis of the wire-breakage sign signal and a wire-breakage threshold;

a wire-breakage threshold setting unit that sets the wire-breakage threshold on the basis of the wire-breakage threshold re-setting instruction and the wire-breakage signal;

a machining energy calculation calculator that calculates a machining energy on the basis of a discharge pulse count inputted from the oscillator;

a machining speed measurement unit that measures a machining speed on the basis of position information inputted from the servo amplifier;

a board thickness calculator that calculates a board thickness of the workpiece on the basis of the machining energy and the machining speed;

a machining-condition switcher that outputs a machining-condition switching instruction according to a predetermined algorithm on the basis of the board thickness, the machining-condition re-setting instruction, and the wire-breakage signal;

a control unit that sends an oscillation instruction to the oscillator and sends a shaft feed instruction to the servo amplifier, so as to make them operate according to a machining condition determined by the machining-condition switching instruction;

a machining-condition storage unit that stores the machining condition corresponding to the board thickness; and a wire-breakage threshold storage unit that stores the wire-breakage threshold corresponding to the board thickness.

8. A wire electric discharge machining method by which a numerical control device controls an oscillator and a servo amplifier to make them operate at a desired machining condition, the servo amplifier controls a servo motor to drive a wire electrode or a workpiece to cause relative movement therebetween, the oscillator outputs a discharge pulse to a machining power supply so that voltage is applied to a machining gap between the wire electrode and the workpiece to machine the workpiece, and a breakage of the wire electrode is detected to output a wire-breakage signal to the numerical control device, the wire electric discharge machining method comprising the steps of:

outputting, when a breakage of the wire electrode is detected, a machining-condition switching instruction to switch to the machining condition for a machining energy decreased by a predetermined value;

calculating a board thickness on the basis of a machining energy and a machining speed;

outputting, when the board thickness varies, a machining-condition switching instruction for switching to the machining condition having been set according to the varied board thickness;

generating a wire-breakage sign signal on the basis of machining state quantities;

re-setting, when the wire-breakage sign signal is larger than a wire-breakage threshold, the wire-breakage threshold to a value increased by a predetermined value to store the wire-breakage threshold and the machining condition;

outputting, when the wire-breakage sign signal is smaller than the wire-breakage threshold, the machining-condition switching instruction for switching to the machining condition for the machining energy increased by a predetermined value to store the wire-breakage threshold and the machining condition; and switching the machining condition according to the machining-condition switching instruction to control the oscillator and the servo amplifier.

9. A wire electric discharge machining method by which a numerical control device controls an oscillator and a servo amplifier to make them operate at a desired machining condition, the servo amplifier controls a servo motor to drive a wire electrode or a workpiece to cause relative movement therebetween, the oscillator outputs a discharge pulse to a machining power supply so that voltage is applied to a machining gap between the wire electrode and the workpiece to machine the workpiece, and a breakage of the wire electrode is detected to output a wire-breakage signal to the numerical control device, the wire electric discharge machining method comprising the steps of:

calculating a board thickness on the basis of a machining energy and a machining speed;

reading out a machining condition having been set according to the board thickness to output a machining-condition switching instruction;

reading out a wire-breakage threshold having been set according to the board thickness and generating a wire-breakage sign signal on the basis of machining state quantities;

outputting, when the wire-breakage sign signal is larger than the wire-breakage threshold, the machining-condition switching instruction to switch to the machining condition for the machining energy decreased by a predetermined value; and switching the machining condition according to the machining-condition switching instruction to control the oscillator and the servo amplifier.

* * * * *